United States Patent

Huang et al.

[11] Patent Number: 5,515,462
[45] Date of Patent: May 7, 1996

[54] OPTICAL INTERCONNECT IN OPTICAL PACKAGES USING HOLOGRAMS

[75] Inventors: Kung-Shiuh Huang, Yorktown Heights; Robert R. Shaw, Poughkeepsie, both of N.Y.

[73] Assignee: International Business Machines Corporation, Armonk, N.Y.

[21] Appl. No.: 267,334

[22] Filed: Jun. 28, 1994

[51] Int. Cl.⁶ ........................................ G02B 5/14
[52] U.S. Cl. .................. 385/37; 359/34; 385/49; 385/38
[58] Field of Search .................... 285/89, 92, 94, 285/31, 37, 39, 42, 49, 50, 88, 44, 14, 15, 16, 23, 36, 38; 359/34

[56] References Cited

U.S. PATENT DOCUMENTS

| | | | |
|---|---|---|---|
| 3,864,016 | 2/1975 | Dakss et al. | 385/49 |
| 4,432,600 | 2/1984 | Falco | 350/96.18 |
| 4,756,590 | 7/1988 | Forrest et al. | 350/96.15 |
| 4,945,400 | 7/1990 | Blonder et al. | 357/74 |
| 5,026,131 | 6/1991 | Jannson et al. | 350/3.7 |
| 5,056,881 | 10/1991 | Bowen et al. | 359/32 |
| 5,067,792 | 11/1991 | Lloyd | 359/14 |
| 5,082,339 | 1/1992 | Linnebach | 385/14 |
| 5,295,208 | 3/1994 | Caulfield et al. | 385/37 |

Primary Examiner—John Ngo
Attorney, Agent, or Firm—Perman & Green

[57] ABSTRACT

An efficient light coupling apparatus for interconnecting two optical components. Light radiation from the first optical component, for example an optical light fiber is directed onto the plane surface of the second optical component, for example a passive waveguide. The light is directed onto the second optical component at a convenient angle such that it impinges on the plane surface of the second optical component at an incident angle. An angularly selective coupling means, for example a volume hologram is located between the first and second optical components for coupling a maximum amount of the light at the incident angle.

1 Claim, 4 Drawing Sheets

OPTICAL INTERCONNECT IN OPTICAL PACKAGES USING HOLOGRAMS

FIELD OF THE INVENTION

The present invention relates to optically interconnecting or coupling optical elements by means of one or more holograms, and more particularly to optically interconnecting optical elements by using volume holograms as diffraction elements for free-space, short range optical linking.

BACKGROUND OF THE INVENTION

With the expanding use of lightwave components for data transmission, optical component packages have been developed incorporating optical fibers and surface and channel waveguides. Placement, orientation and routing as well as the alignment and interconnection of the optical components in optoelectronic packages becomes more difficult where space and topography become more restricted.

The present invention is directed to providing efficient interconnects within an optical or electroptical package. Background art within this technology is described in the following references.

U.S. Pat. No. 4,432,600 issued Feb. 21, 1984 to Falco entitled "Method and Apparatus for Coupling at Least Two Optical Fibers by Means of a Holographic Lens" discloses a process of coupling optical fibers by means of a holographic lens, and an apparatus for carrying out this process. A holographic lens is recorded conventionally by utilization of a provisional hologram, by means of two monomodal optical fibers mounted by their respective end pieces in a block used to support the holographic lens. The block has bores, clearly defined in shape and position, into which are introduced the end pieces of monomodal fibers to effect recording of the holographic lens, and in which are fixed the end pieces of multimodal fibers to effect recording of the holographic lens, and in which are fixed the end pieces of multimodal fibers which are to be optically coupled after withdrawal of the monomodal fibers. The process and apparatus of the invention enables the speckling phenomenon, i.e., that of non-uniform distribution of light in the transmitted beams, to be suppressed, improving the efficiency of the holographic lens.

U.S. Pat. No. 4,756,590 issued Jul. 12, 1988 to Forrest et al. entitled "Optical Component Package" discloses an optical package including at least one electro-optical component aligned with at least one optical fiber. The electro-optical component is mounted on a surface which is essentially parallel to, but not coplanar with, the longitudinal axis of the fiber and light is coupled between the fiber and component by bending the light path. Electrical connection to the component is provided by conductors mounted over the same surface, thus producing a compact package. The invention is used preferably with arrays of components and fibers to eliminate the need for a vertical fanout to contact the components.

U.S. Pat. No. 4,945,400 issued Jul. 31, 1990 to Blonder et al. entitled "Subassembly for Optoelectronic Devices" describes a subassembly for use in packaging an optoelectronic device (e.g., LED or photodiode) that includes a semiconductor (e.g., silicon) base and lid having a variety of etched features (e.g., grooves, cavities, alignment detents) and metalization patterns (e.g., contacts, reflectors) which enable the device to be reliably and inexpensively mounted on the base and coupled to the fiber.

U.S. Pat. No. 5,026,131 issued Jun. 25, 1991 to Jannson et al. entitled "High Channel Density, Broad Bandwidth Wavelength Division Multiplexer with Highly Non-Uniform Bragg-Littrow Holographic Grating" discloses a wavelength division multiplexer/demultiplexer having optical path lengths between a fiber array and a Fourier transform lens, and between a dispersion grating and the lens equal to the focal length of the lens. The equal optical path lengths reduce losses due to angular acceptance mismatch in the multiplexer. Close orientation of the fiber array about the optical axis and the use of a holographic dispersion grating reduces other losses in the system. Multi-exposure holographic dispersion gratings enable the multiplexer/demultiplexer for extremely broad-band simultaneous transmission and reflection operation. Individual Bragg plane sets recorded in the grating are dedicated to and operate efficiently on discrete wavelength ranges. A volume Bragg vertically non-uniform holographic grating enables operation of the multiplexer or other devices that act on light waves according to wavelength over nearly the full usable 0.8–1.3 μm wavelength range.

U.S. Pat. No. 5,056,881 issued Oct. 15, 1991 to Bowen et al. entitled "Collimated Laser Diode" teaches an optical source that comprises a laser light source for emitting light in a light path and at least one holographic optical element disposed in the light path; wherein the laser light source and the holographic optical element are integrated into a monolithic structure. The holographic optical element collimates emitted light, circularizes emitted light, compensates for optical source wavelength shifts, launches the emitted light so that it is efficiently coupled to an optical fiber, and/or isolates the laser light source from interfering reflected light. Since the optical source is disposed in a single monolithic structure and a discrete holographic optical element may perform five distinct functions, the optical sources are compact, commercially versatile and easy to handle.

U.S. Pat. No. 5,067,792 issued Nov. 26, 1991 to Lloyd entitled "Method and Apparatus for Interfacing of Holographic and Electronic Data" discloses an apparatus for interfacing holographic and electronic data that comprises an input/output port for the interfacing of a holographic wavefront interference pattern and an electronic array capable of producing digital electronic information from a holographic wavefront input and for converting electronic information into holographic information using optical fibers, sensors, and optical switches. In one embodiment a plurality of optical fibers having a small end and a large tapered end are operably combined with a plurality of optical sensors wherein each of said optical sensors provide a digital signal of 1 if lit and a digital signal of 0 if unlit.

U.S. Pat. No. 5,082,339 issued Jan. 21, 1992 to Linnebach entitled "Optical Read-Write Head with Diffraction Grating Structure" describes a holographic optical component and its use for reading the writing/reading heads. This application requires a minimum size and low weight for the holographic optical components. This is achieved in accordance with the invention by arranging a laser element and a grating structure, which is integrated on a waveguide layer and acts as a holographic optical system, on a large sized surface side of a flat carrier element such that a light beam of the laser element impinges directly on the grating structure and is so converted by the grating structure that it exits from the component.

SUMMARY OF THE INVENTION

Optical signals can have an advantage over electronic signals at high data rates/frequency, and when electronic noise becomes a problem. Such optical signals are generally routed through waveguides, such as optical fibers or surface or channel waveguides. Placement and orientation of these waveguides becomes more difficult in practical optoelectronic systems, where space and topography restrictions are very tight.

An object of the present invention is to provide short range, free-space interconnects within an optical package to solve routing problems.

A further object of the present invention is to provide interconnections between optical elements in a package using volume holograms as diffraction elements.

Still another object of the present invention is to provide a volume hologram as an optical interconnect wherein the hologram is responsive to light beam signals at selected angles.

BRIEF DESCRIPTION OF THE DRAWING

The above set forth and other features of the invention are made more apparent in the ensuing Detailed Description of the Invention when read in conjunction with the attached drawings, wherein.

DETAILED DESCRIPTION OF THE INVENTION

Figure 1:
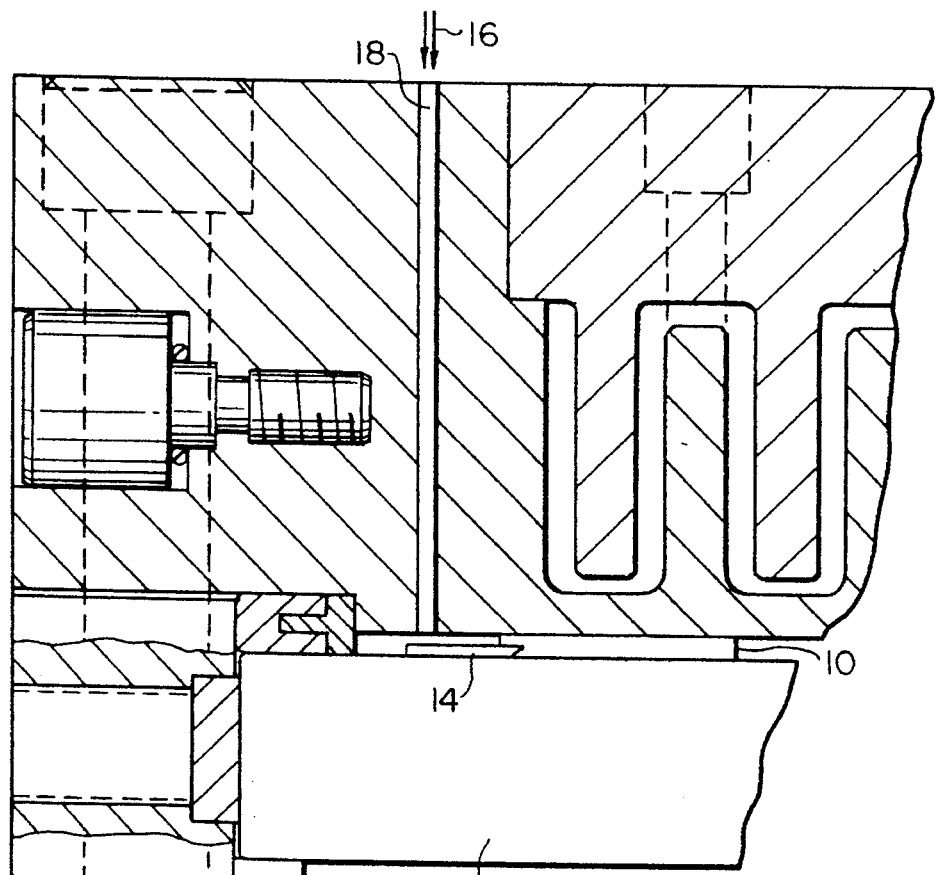
FIG. 1 is a sectional schematic illustration of an optical module assembly package wherein light is introduced into the top of the module normal to a passive waveguide.
Figure 2:
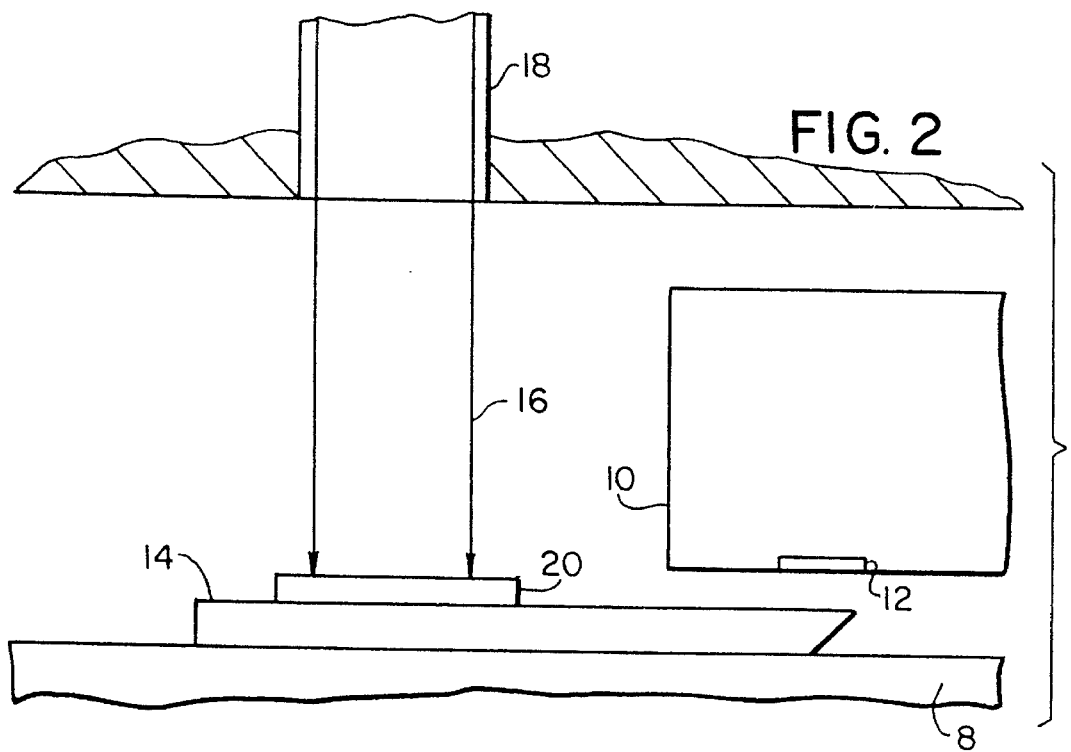
FIG. 2 is a detailed view of a portion of the module assembly of FIG. 2 showing a hologram waveguide disposed on the passive waveguide in the path of light.

Referring to FIG. 1, a cross-section of an optical module assembly is shown wherein space and topology are restricted. A semiconductor chip 10 is secured to the module. Referring to FIG. 2, which shows the structure of FIG. 1 on a larger scale, an optical element 12, which may be a laser, a light emitting diode or receiver is incorporated into the semiconductor chip 10. An optical component, for example a passive polymer waveguide 14 is pre-aligned with the optical element 12 and also secured to a substrate 8 of the module. In FIGS. 1 and 2, a light beam signal 16 is brought into the module by another optical component, for example, an optical fiber 18 which penetrates the top of the module. The problem now is how to efficiently link the passive waveguide 14 to the light signal beam 16 in the optical fiber 18 in view of space and topology restriction. A volume hologram 20 is disposed on waveguide 14 beneath optical fiber 18.

The hologram 20 functions as a volume grating structure that efficiently couples light signal into passive waveguide 14.

Because holograms are angularly selective, the hologram 20 is fabricated such that whenever the input light beam signal path is normal to the passive waveguide 14, as in FIGS. 1 and 2, the input light beam signal 16 will automatically be guided into waveguide 14 with very high coupling efficiency. Hologram 20 can be fabricated to be large enough to cover all the possible input areas so that no matter where the input, normal light beam signal 16 hits the surface of the hologram 20, it is always coupled into the waveguide with the same high efficiency.

Figure 3:
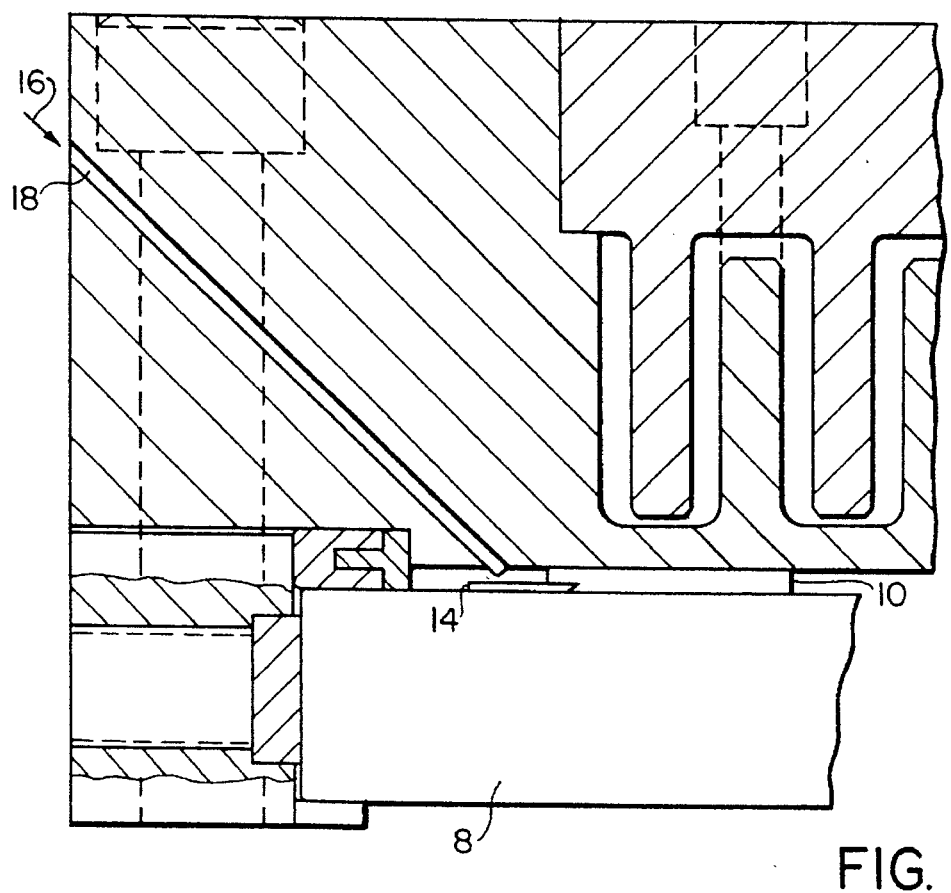
FIG. 3 is a sectional schematic illustration of an optical module assembly package similar to that of FIG. 1 except that the light is introduced in a non-normal path incident to the passive waveguide.
Figure 4:
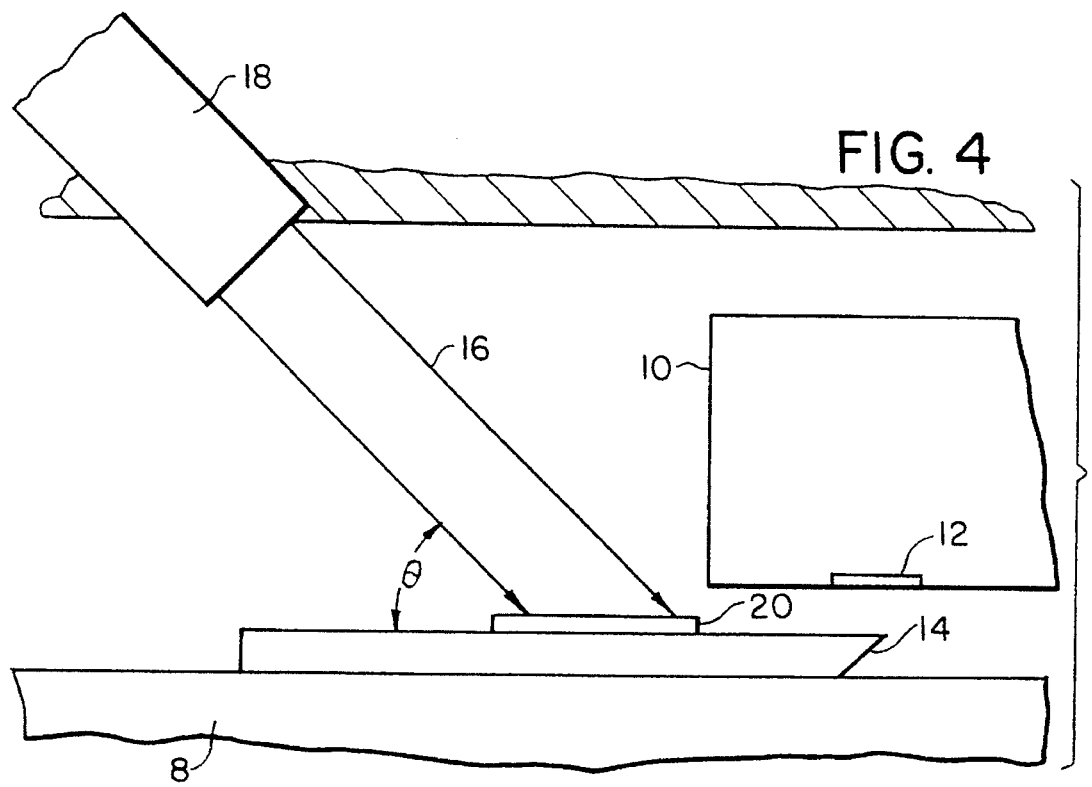
FIG. 4 is a large scale view of a portion of the structure of FIG. 3 showing a hologram disposed on the passive waveguide.

FIG. 3 illustrates an embodiment of the invention wherein the light beam signal 16 and optical fiber 18 are not normal to the passive wave guide 14, but is brought into the module at an incident angle ϕ. FIG. 4 shows a portion of the embodiment of FIG. 3 in larger scale. The embodiment of FIG. 3 and 4 is employed wherein, due to space and topological packaging restrictions, the optical fiber 18 can not be brought in through the top of the module and therefore the light beam signal 16 is not normal to the waveguide 14.

Again, because of the angular selectivity of the hologram 20, it can be fabricated such that whenever the light beam 16 is at the incident angle ϕ, the light will be automatically guided into waveguide 14 via hologram 20 with very high coupling efficiency.

Thus, a light beam may be brought into the module assembly at a convenient angle and interconnected to an optical element, as long as the angle is within the limits of the angular selectivity of the fabricated hologram interconnect element.

Figure 5:
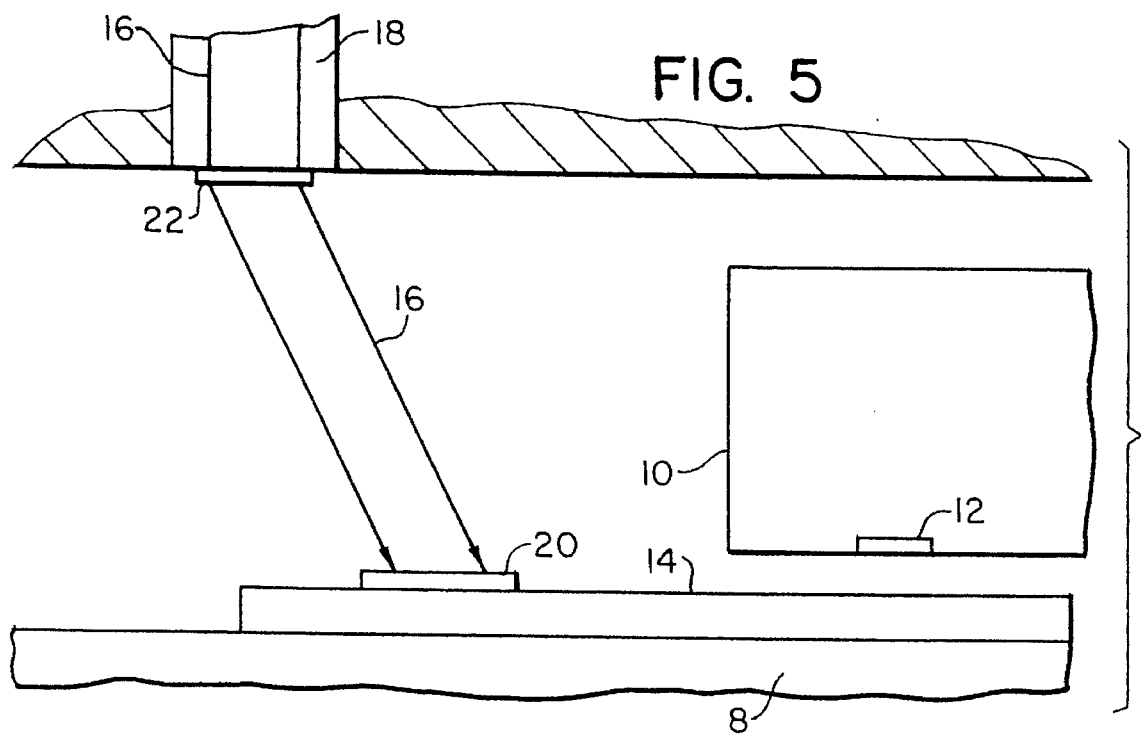
FIG. 5 is a sectional schematic illustration of an optical module assembly using two holograms.

Referring to FIG. 5, an embodiment of the present invention is illustrated wherein two holograms are used in combination. In addition to hologram 20, a second hologram 22 is secured on the end of the incoming fiber optic 18. The hologram 22 is used when the incoming fiber optic 18 is not directly above, but at a relatively great lateral distance from the hologram 20 on the waveguide 14.

Figure 6:
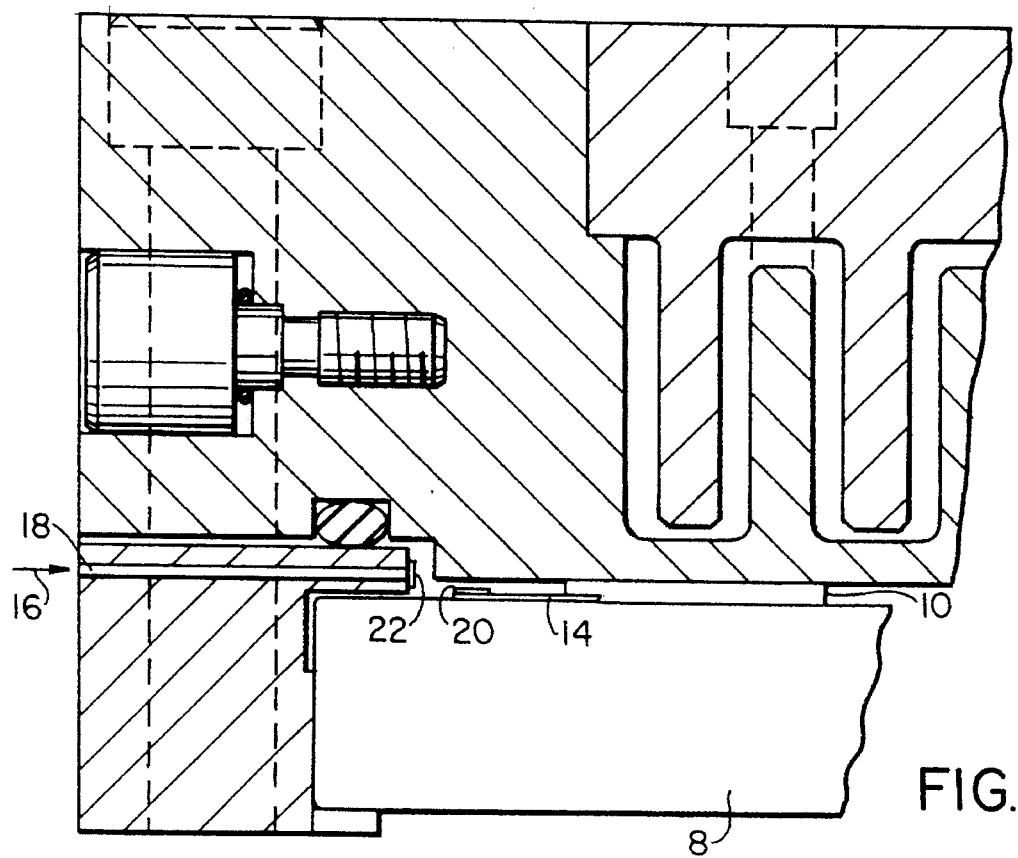
FIG. 6 is a sectional, schematic illustration of an optical module assembly using two holograms and wherein light is introduced into the side of the module.
Figure 7:
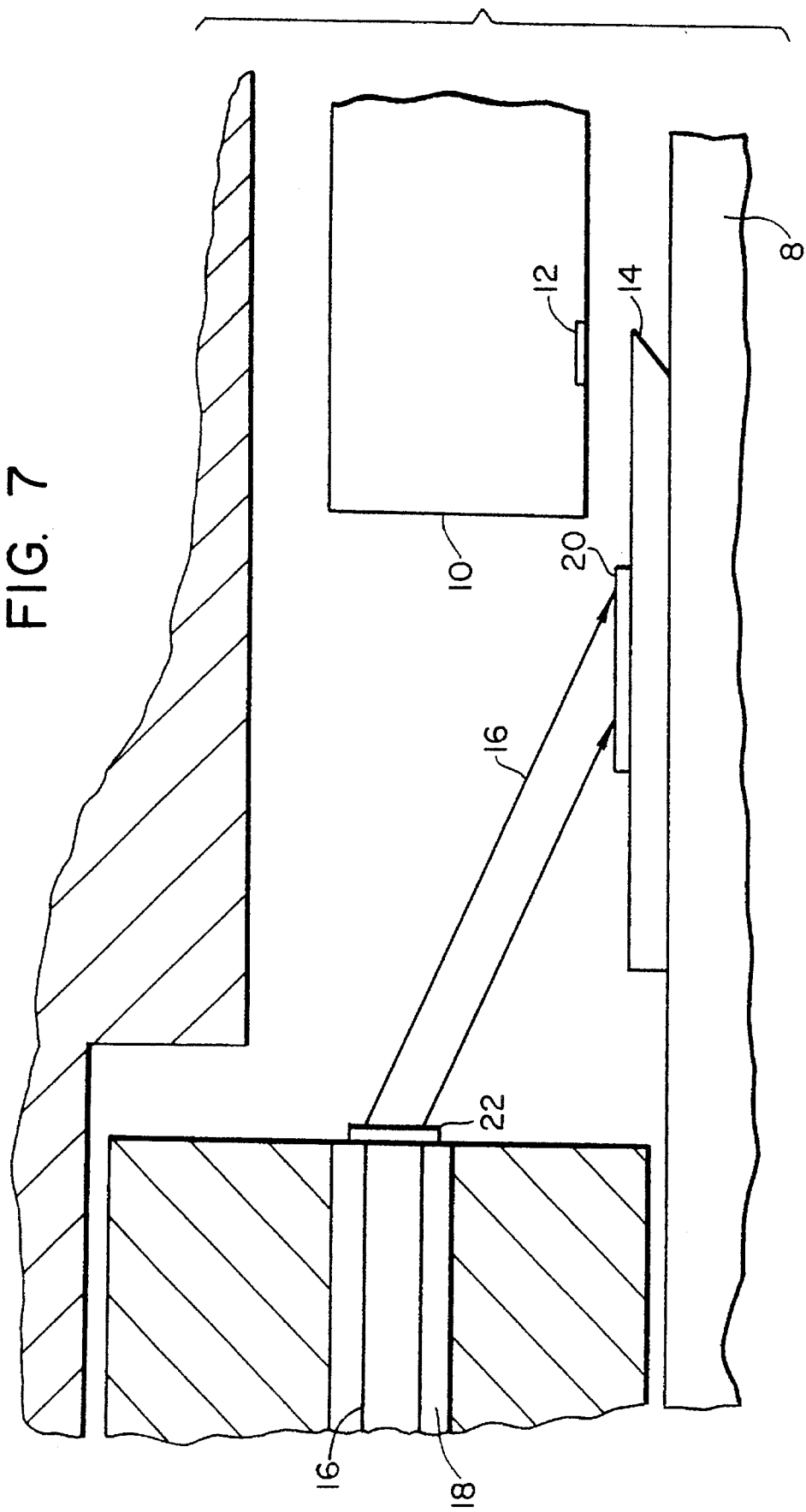
FIG. 7 is a larger scale view of a portion of the module assembly of FIG. 6 showing the two holograms and the passive waveguide.

FIG. 6 illustrates an embodiment wherein two holograms are used in combination with a light beam signal 16 being introduced via optical fiber 18 into the module assembly from the side. FIG. 7 shows a portion of the FIG. 6 on a larger scale.

The volume holograms 20 and 22 used in the present invention for the embodiments illustrated in FIGS. 1 through 7 may be the type fabricated from dichromated gelatin. Holograms 20 and 22 are used as diffraction elements and they have an efficiency of approximately ninety percent. The holograms 20 and 22 may be fabricated by encoding dichromated gelating material into a glass plate or film, and then optically exposing it with laser beams to create the desired diffraction properties. In another fabrication method that may be employed, an amplitude hologram can first be generated by a computer, and written out using a computer plotting for higher efficiency. Then the hologram can be copied into other high efficient holographic materials for forming a high efficiency phase hologram.

The following four publications, incorporated herein by reference, teach methods for making dichromated gelatin hologram structures.

1. B. J. Chang and C. D. Leonard, "Dichromated Gelatin for the Fabrication of Holographic Optical Elements", {\it Applied Optics}, Vol. 18, No. 14, pp. 2407–2417, 1979.

2. K. S. Huang, "Interconnection Hologram", in Chapter 9.1 of {\it Digital Optical Cellular Image Processor}, World Scientific Publishing Co., 1991.

3. D. Meyerhofer, "Phase Holograms in Dichromated Gelatin", {\it RCA Review}, Vol. 33, pp. 110–130, 1972.
4. T. A. Shankoff, "Phase Holograms in Dichromated Gelatin", {\it Applied Optics}, Vol. 7, No. 10, pp. 2101–2150, 1968.

The following publication, incorporated herein by reference, teaches a method of recording the wavefronts that effect the spatial interconnect properties of the light beam, including angular selectivity.

5. Kogelnik, "Coupled Wave Theory for Thick Hologram Gratings", {\it Bell Syst. Tech. J.}, Vol. 48, No. 9, pp. 2909–2947, 1969.

Although the invention has been described showing light being coupled from an optical filler into a passive waveguide, the present invention can be used to couple light between other combinations of optical elements, for example from one optical filler to another.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. Apparatus for efficiently coupling light emerging from an optical fiber into an optical waveguide disposed in an optoelectronic module wherein space and topography are restricted comprising: an optical fiber for conducting light radiation, a passive optical waveguide having a plane surface and spatially separated from said optical fiber for guiding light radiation emerging from said optical fiber, said light radiation emerging from said optical fiber impinging on said optical waveguide at a predetermined angle, and angularly selective coupling means including a volume hologram disposed on said plane surface of said optical waveguide on said space and topography restricted module between said optical fiber and said optical waveguide in the path of said light radiation emerging from said optical fiber, said angularly selective coupling means being angularly selective for coupling a maximum of said emerging light radiation into said optical waveguide at said predetermined angle, wherein said volume hologram is disposed laterally with respect to said optical fiber and wherein said coupling means further includes a second volume hologram disposed on said optical fiber in the path of said light radiation emerging from said optical fiber.

* * * * *